United States Patent
Hammerschlag

[11] 3,799,021
[45] Mar. 26, 1974

[54] CIRCULAR SAWS

[76] Inventor: Georg Hammerschlag, Glzichtslaan 82, Bilthoven, Netherlands

[22] Filed: Apr. 17, 1972

[21] Appl. No.: 244,357

[30] Foreign Application Priority Data
Apr. 26, 1971 Germany............................ 2121200

[52] U.S. Cl......................... 83/491, 83/490, 30/389
[51] Int. Cl............................................... B27b 5/14
[58] Field of Search ................. 83/490, 491; 30/389

[56] References Cited
UNITED STATES PATENTS
| | | | |
|---|---|---|---|
| 2,972,363 | 2/1961 | Santilli | 83/491 |
| 3,086,567 | 4/1963 | Jetten | 83/490 |

*Primary Examiner*—Donald R. Schran

[57] ABSTRACT

A circular sawing machine having one or multiple circular sawing blades driven at their outside periphery by one or more single or multiple strand chains of the type having inside and outside links connected by pins, the saw blades having for this purpose teeth, the teeth which go in between the inside links of the chain doing this with little clearance, and the teeth going in between the outside links of the chain carrying cutting elements wider than the saw blade, but still capable of passing with ample clearance between the outside links.

The saw blade or blades are not supported by a shaft, but shaped annular or flat. The annular saw blades can be supported by circumferentially grooved rollers located at the inside periphery of the saw blades with the blades fitting in the grooves and in addition indirectly by rollers on extensions of the chain pins rolling on a hollow cylindrical member attached to the frame of the machine just outside of the periphery of the saw blades.

The latter rollers can roll in grooves in these hollow cylindrical members, thus not only supporting the saw blades radially, but also axially.

If the chain and cylindrical hollow member enclose sufficiently more than 180° of the circumference of the saw blades, or if there are two or more chains on sufficiently opposed sides of the saw blades, the rollers on the internal periphery of the annular saw blades can be omitted and the saw blades can be flat circular plates instead of annular plates.

2 Claims, 6 Drawing Figures

CIRCULAR SAWS

BACKGROUND OF THE INVENTION

Circular saws presently used are mostly of the shaft-driven, shaft-supported type and limited in the depth they can penetrate, because the shaft does not allow penetration beyond somewhat less than half the diameter. For sawing thick materials we see therefore that if a single cut has to be made, bandsaws are often used, and that if multiple cuts have to be made, reciprocating saws are often used.

The band saws have as disadvantage their not very accurate cutting. The reciprocating saws have as disadvantage slow operation, caused by limited cutting speed, loss of time during acceleration and deceleration, and in some cases because the cutting elements can only be used in one direction. In other cases, like sawing stone, the cutting elements, usually set with diamonds, can be used in both directions, but will wear if used this way much faster, which is a serious burden because of their high cost.

The present invention tries to improve this situation by using circular saws driven at their outside periphery and supported at or near their outside periphery, both for single cut sawing machines and multiple cut sawing machines.

SUMMARY OF THE INVENTION

This invention concerns itself with circular saws driven at their outside circumference by a chain of the type having inside and outside links connected by pins, which may or may not have rollers on them where engaging with the saw blade. The outside circumference of the saw blade has teeth which engage with the chain. The teeth which go in between the inside links of the chain do this with little clearance. The teeth which go in between the outside links of the chain carry cutting elements wider than the saw blade, but still capable of passing with ample clearance between the outside links.

This principle of driving a circular saw blade could be used to drive a conventional circular saw blade with a center shaft, in which case it would serve to transmit the driving force more directly to the cutting elements than is possible with a shaft-driven saw blade. This will reduce deflections in the system as well as related vibratory phenomena, leading to a neater saw cut and longer saw blade life. This in itself is not new and known from the German Gbm No. 1,700,494, which shows this drive for a conventional shaft-supported circular stone saw.

The specific object of this invention is to use the before mentioned principle of driving a saw blade such that the center shaft can be omitted and the saw blade formed as an annular plate or as a circular plate. The advantage of such configurations is that the saw blade can penetrate much deeper into the material to be cut than is possible with a conventional blade having a center shaft, while maintaining the already mentioned advantage of a more direct transmission of the driving force to the cutting elements.

Annular saw blades in themselves are known as can be seen in U.S. Pat. Nos. 2,572,065 and 2,590,898, British Pat. No. 118,846 and Swedish Pat. No. 70,233, but not with the kind of drive described in this specification.

As there is no shaft to support the saw blade, other means are needed to support it rigid enough that accurate saw cuts can be made.

If the saw blade is annular, this can be accomplished by providing a multitude of rollers on the inside of the blade, these rollers having circumferential grooves in which the saw blade fits with little clearance, thus preventing it also from moving sideways. These rollers can be situated all around the inside periphery of the annular saw blade, except for an opening through which the material to be sawed can pass.

In addition the saw blade can be supported indirectly by rollers on the pins of the roller chains, the pins for this purpose being extended outside the links and the rollers located on these pin extensions. The rollers are large enough in diameter that they can roll on a hollow cylindrical member located just outside of the outside periphery of the saw blade and attached to the frame of the machine.

The hollow cylindrical member can have grooves in which the rollers run with little clearance, or rims which fit with little clearance in circumferential grooves in the rollers, thus positioning the saw blade also sideways.

This method of supporting the saw blade sideways makes it possible to omit the rollers on the inside periphery of the annular saw blade, and also to use instead a simple circular plate as saw blade, possibly with just a small hole in the center for manufacturing and/or assembly purposes. To achieve complete radial support it will be necessary in these cases to extend the chain over sufficiently more than 180° around the saw blade, or support the saw blade with two or more chains located at sufficiently opposing sides of the saw blade.

The hollow cylindrical member can have more or less abrupt ends with the chain supported by sprockets some distance away from the saw blade, but it can also have instead rounded ends over which the chain can roll with the rollers on the chain pin extensions. Grooves or rims on the hollow circular member can be continued over these rounded ends.

It is also the object of this invention to form the drive as well as the supporting means such that multiple saw blades can be placed in close proximity to each other, allowing the sawing of any practical number of plates or boards in one operation. This can be accomplished by using one or more multiple strand chains, multiple support rollers on the inside of annular sawing blades and rollers on the pins of chains supporting the saw blades indirectly against hollow cylindrical members, the latter rollers located on pin extensions outside the links of the chain or located on the chain pins in between the strands of the chain or both.

The first of the two preferred embodiments described in this specification can be used to advantage for sawing blocks of stone into plates, but basicly the same machine can be used to saw blocks of other material in plates. If equipped with one saw it can be used to saw longitudinal pieces of material to a specific length.

In a second preferred embodiment, the invention can be used to saw wooden logs longitudinal, either with one saw blade or with more saw blades, the latter for instance to make boards. Basically the same machine can be used to saw other materials and if turned 90° it can be used for the same purposes as the first embodiment.

The general nature and objects of the invention having been thus explained and the drawings showing two specific embodiments of the invention, the invention will be best understood as these embodiments are explained in this specification, and the novel features of the invention will be set forth in the claims.

BRIEF DESCRIPTION OF THE DRAWINGS

In the drawings:

FIG. 2 is a plan view with the hollow cylindrical member omitted to better show the chain drive. For clarity reasons a set-up with only three saw blades is shown, but a saw of this type will generally have more saw blades so that a complete, roughly cubical stone can be sawed in plates in one operation.

FIG. 3 is a side elevation of the detail shown in FIG. 2, seen from the same side as FIG. 1, with partial cuts through some elements to better clarify the design.

DESCRIPTION OF THE PREFERRED EMBODIMENTS

Figure 1:
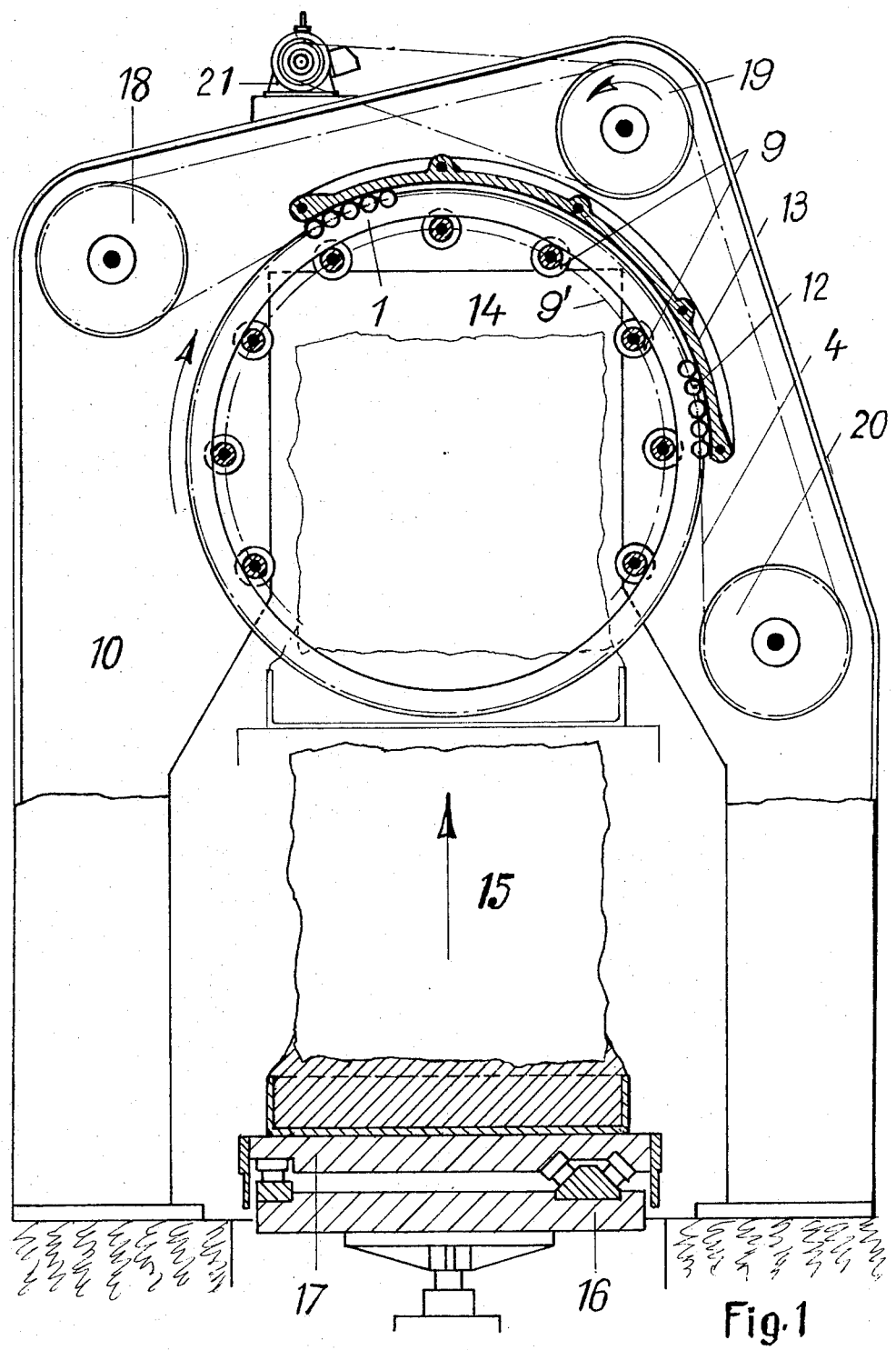
FIG. 1 is a side elevation of a sawing machine for sawing stone into plates, embodying the present invention.

Referring now to the drawings, in FIG. 1 can be seen one of a number of annular saw blades 1, supported on their inside by a multitude of slotted rollers 9, the saw blades fitting with little clearance in the slots. Ths shafts on which these rollers are mounted, are located in this case on a circular center line 9' and attached to the frame 10. The annular saw blades are driven by the multiple strand chain 4. (Shown in more detail in FIG. 2 and FIG. 3.) The saw blades 1 are supported on their outside indirectly by rollers 12, mounted on pin extensions of chain 4, and rolling against the hollow cylindrical member 13, which is attached to the frame 10.

Figure 2:
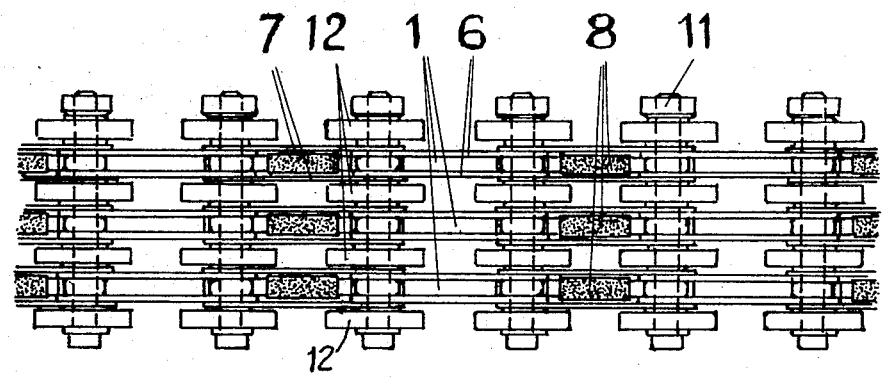
FIG. 2 and FIG. 3 show enlarged part of the annular saw blades of FIG. 1, with the multiple strand driving chain, the supporting rollers and the hollow cylindrical member.
Figure 3:
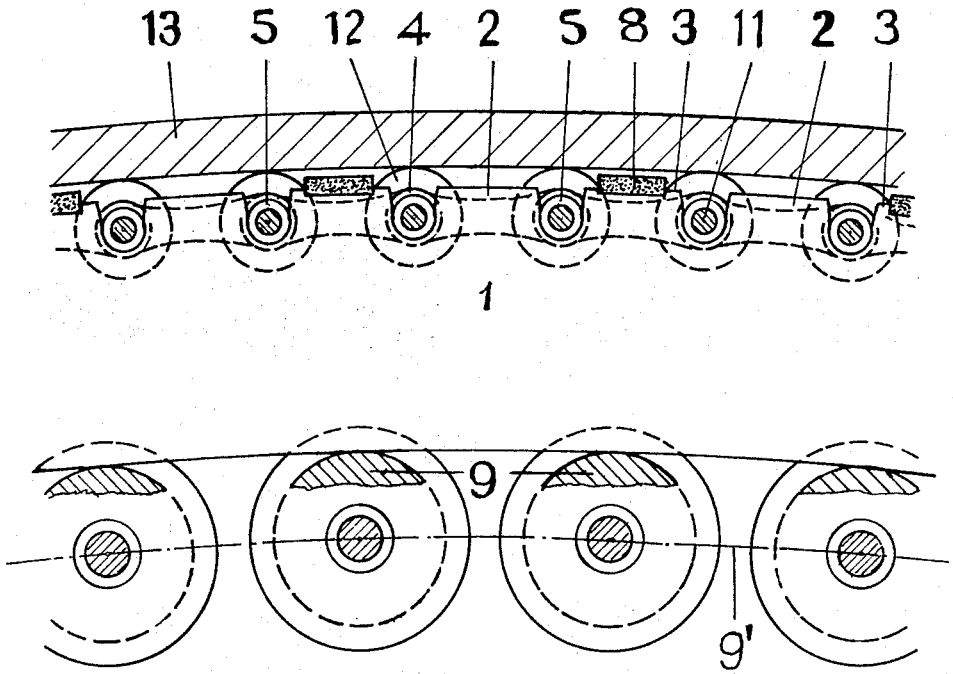

In FIGS. 2 and 3 can be seen the chain 4, with its rollers 5, engage in conventional way the teeth 2 and 3 on the annular saw blades 1. The teeth 2 fit with little clearance between the inside links 6 of the chain. The teeth 3 carry the cutting elements 8, which are wider than the saw blades 1. The inside links 6 are thick enough that the cutting elements 8 can pass with ample clearance between the outside links 7 of the chain.

The pins 11 of the roller chain, carry in addition to the rollers 5, which engage with the teeth of the saw blades, the rollers 12, which support the saw blades indirectly by rolling on the hollow cylindrical member 13.

Referring back to FIG. 1, the frame 10, having roughly the form of an inverted letter U, surrounds a roughly square space 14 into which a block of stone 15 can be moved slowly from below with a hydraulicly or otherwise operated lifting mechanism 16, while at the same time being cut into plates by the rotating annular saw blades. The position of the stone 15, when it is in its highest position is shown in thin lines. The stone 15 is not directly supported by the lifting mechanism 16, but by way of a carriage 17, which can move sideways for proper positioning of the stone.

It will also be possible to mount the frame 10 on a lifting mechanism and/or a carriage for sideways motion, and place the stone to be cut in a fixed position or give it only one of the two motions.

The drive chain 4, engaging with the saw blades 1, is supported further by the sprockets 18, 19 and 20. The sprockets 19 are driven in conventional way by a motor 21, such that the saw blades will work with optimum cutting speed. The arrows in FIG. 1 show the directions of movement when cutting.

Figure 4:
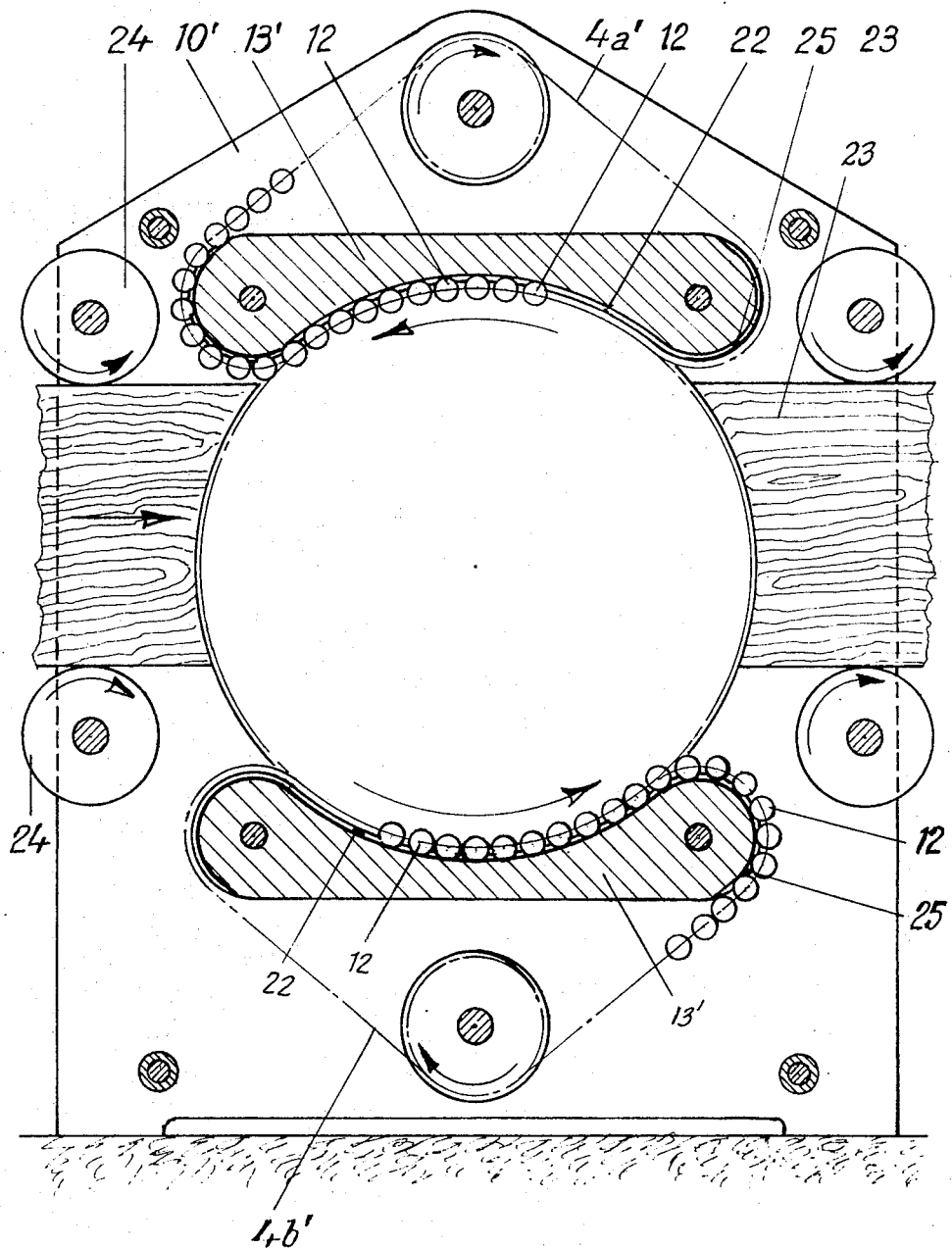
FIG. 4 shows a second embodiment of the invention, a sawing machine to saw wooden beams or logs into boards.

FIG. 4 shows the second embodiment of the invention with saw blades 1 and two multiple strand chains 4a and 4b. They can both be driven in a synchronous way or only one of the two driven and the other one idling. They are arranged such that the material to be sawed can pass between them; shown is a piece of wood 23, which is moved slowly through the saw with transportation rolls 24, while at the same time being cut into boards by the rotating saw blades.

Figure 5:
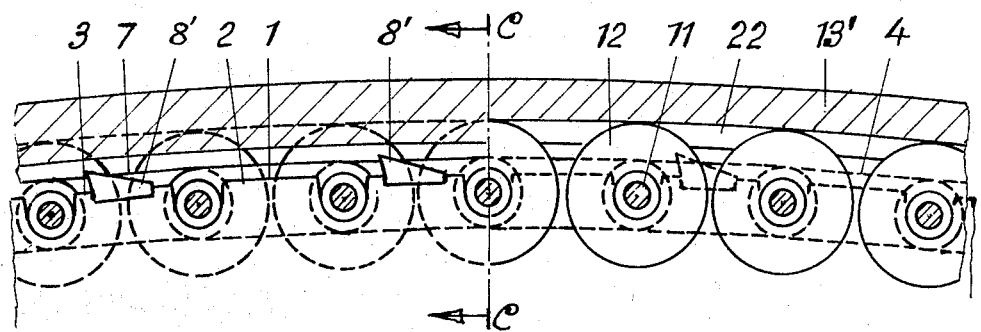
FIG. 5 and FIG. 6 are enlarged sections through the drive of this embodiment, somewhat like FIGS. 2 and 3 of the previous embodiment. They are for clarity reasons not drawn on the same scale. Shown is a set-up with four saw blades, but as with the first embodiment, in actual practice it will probably have more blades.
Figure 6:
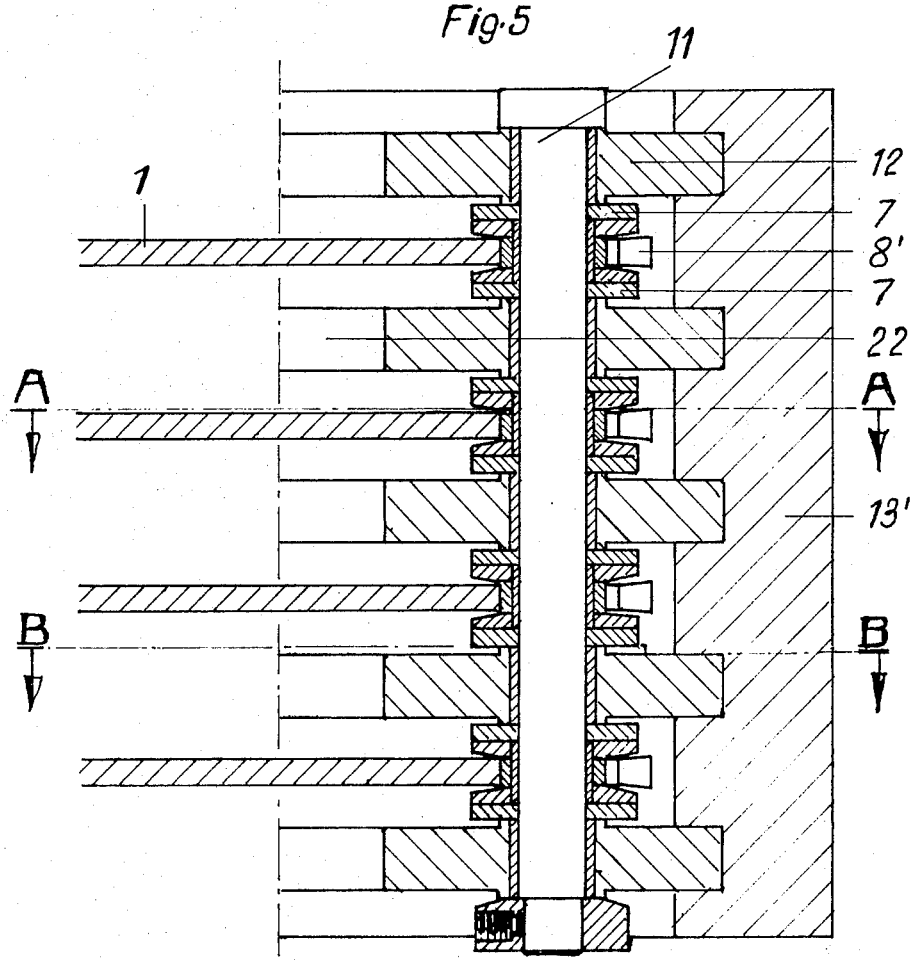

FIG. 5 and FIG. 6 show enlarged the details of the chain drive. FIG. 5 shows two sections in the same side elevation as shown in FIG. 4. FIG. 6 is a section through the chain drive as indicated with C—C in FIG. 5. The saw blades 1 are engaged by the chain 4 in the same way as shown in the first embodiment. The cutting elements 8 however are of a different type, since this saw is intended for sawing wood. The rollers 12 on the pins 11 of the roller chain run with little clearance in grooves 22 in the hollow cylindrical members 13, attached to the frame 10 (FIG. 4), thus positioning the saw blades both in the radial direction and in the axial direction.

Referring back to FIG. 4, the hollow cylindrical members 13 have rounded cylindrical ends. Circular grooves 25 in these ends are continuations of the grooves 22 in the main part of the members 13. The chain can roll with its rollers 12 in the grooves 25 around these ends, which can in this way replace sprockets to support the chain.

This configuration could also be used to saw blocks of stone. In that case however, the machine should be turned 90° and the feed of the material be vertical as is shown in the first embodiment (FIG. 1). Naturally other cutting elements would have to be used too.

What is claimed is:

1. A sawing machine having one or more circular sawing blades, each blade supported at its outside periphery by one or more chains of the type having inside and outside links connected by pins, the saw blade having for this purpose teeth, the teeth which go in between the inside links of the chain doing this with little clearance, and the teeth going in between the outside links of the chain carrying cutting elements wider than the saw blade but still capable of passing with ample clearance between the outside links, the pins of the chain having rollers, rolling against a hollow cylindrical member mounted to the frame of the machine.

2. A circular sawing machine as described in claim 1, having in addition a concentric hole in the circular sawing blade, the inside periphery of this hole rolling against one or more rollers mounted to the frame of the machine.

* * * * *